(No Model.) 3 Sheets—Sheet 1.
D. A. WOODHOUSE & T. V. FORSTER.
FIREMAN'S ELECTRIC WIRE CUTTER.
No. 404,667. Patented June 4, 1889.
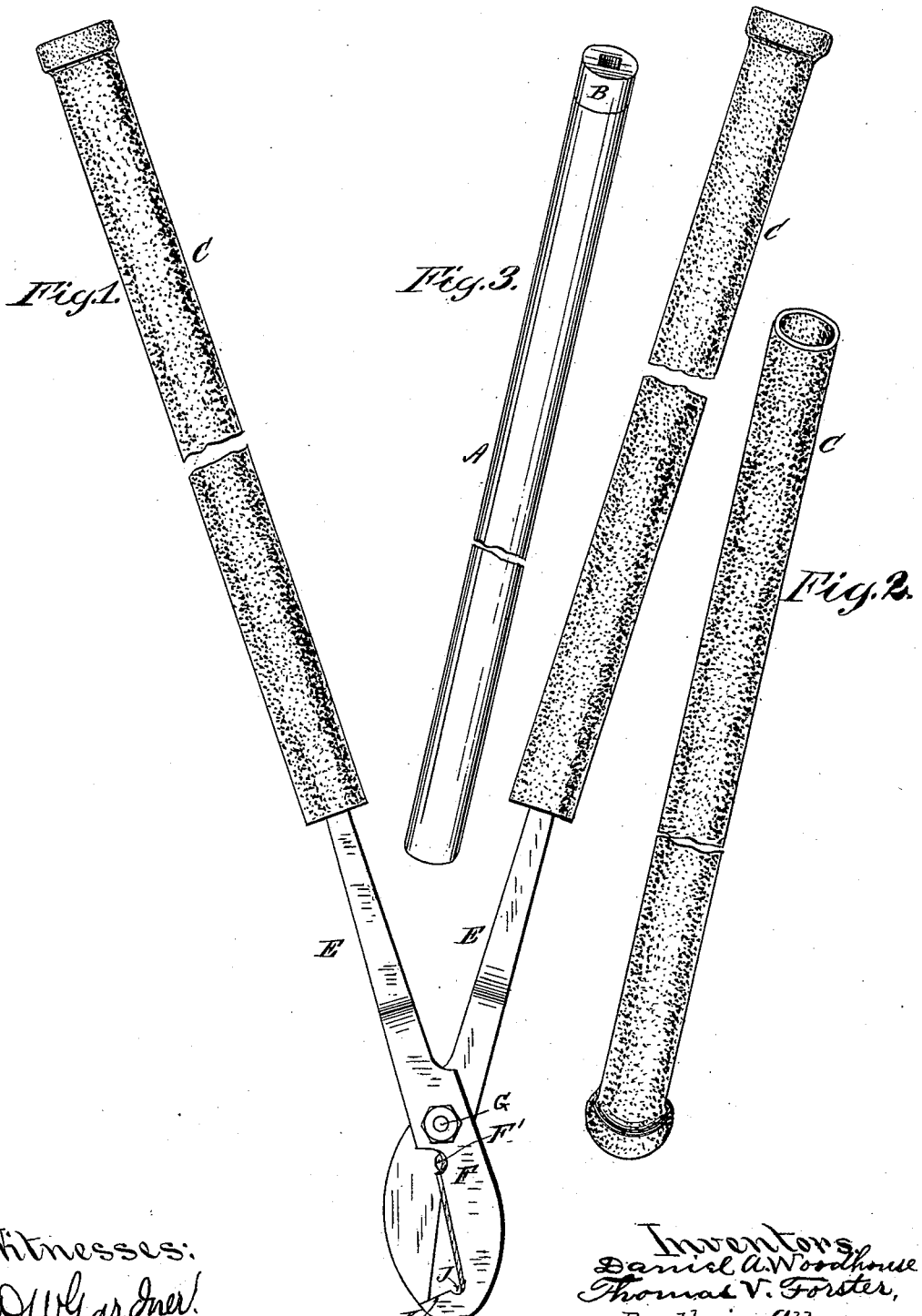

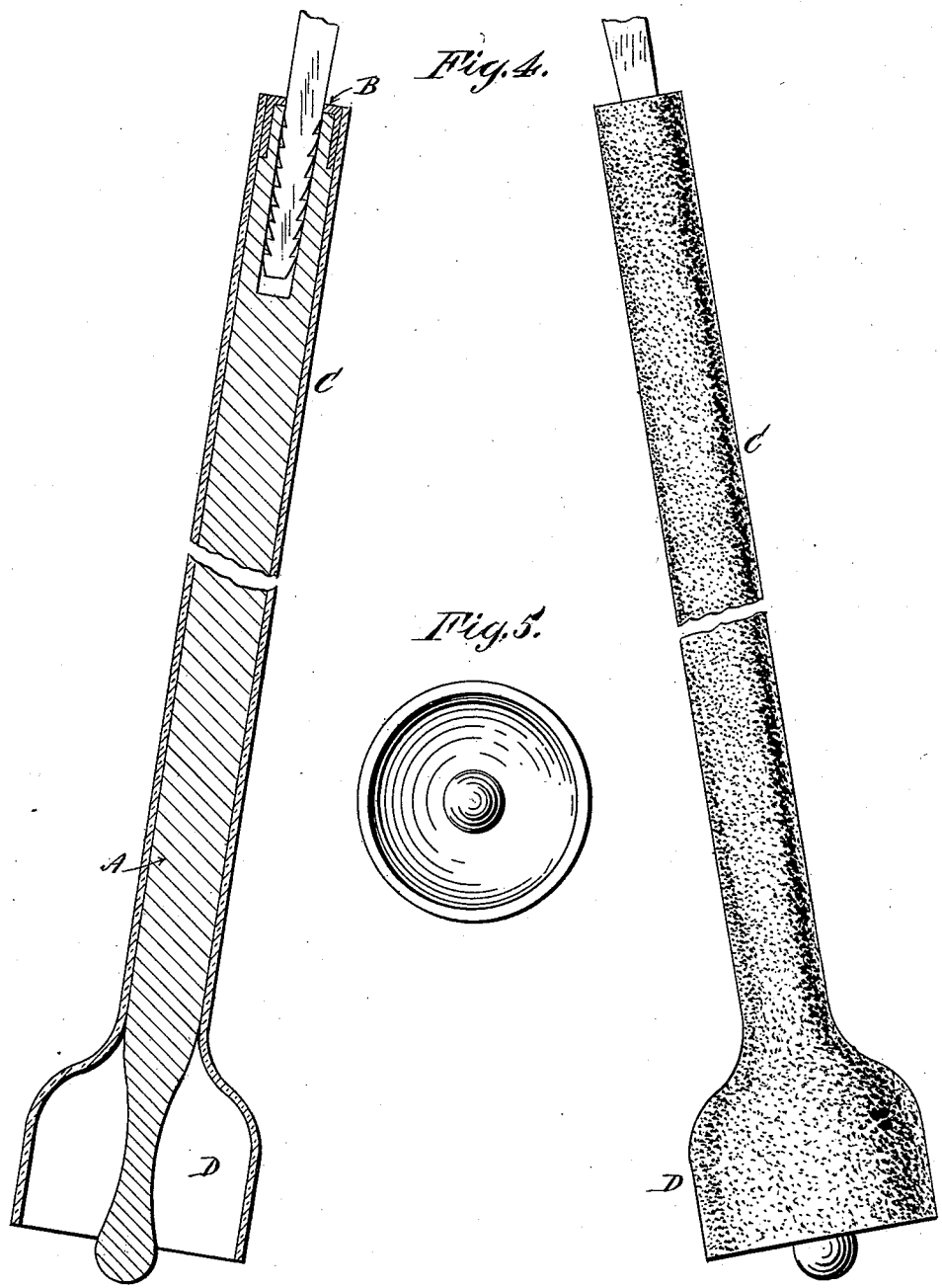

(No Model.) 3 Sheets—Sheet 3.

D. A. WOODHOUSE & T. V. FORSTER.
FIREMAN'S ELECTRIC WIRE CUTTER.

No. 404,667. Patented June 4, 1889.

Witnesses:
D. W. Gardner
Nellie L. Pope

Inventors:
Daniel A. Woodhouse
Thomas V. Forster
By their Attorney
Edward P. Thompson

UNITED STATES PATENT OFFICE.

DANIEL A. WOODHOUSE, OF ELIZABETH, NEW JERSEY, AND THOMAS V. FORSTER, OF BROOKLYN, NEW YORK.

FIREMAN'S ELECTRIC-WIRE CUTTER.

SPECIFICATION forming part of Letters Patent No. 404,667, dated June 4, 1889.

Application filed March 2, 1889. Serial No. 301,762. (No model.)

*To all whom it may concern:*

Be it known that we, DANIEL A. WOODHOUSE, a citizen of the United States, and a resident of Elizabeth, Union county, New Jersey, and THOMAS V. FORSTER, of Brooklyn, Kings county, State of New York, and a citizen of the United States, have invented new and useful Improvements in Firemen's Electric-Wire Cutters, of which the following is a specification.

Our invention relates to a device for firemen's use in cutting down electric-light, telephone, and telegraph conductors from poles and buildings during the continuance of a conflagration; and the object of the invention is to provide wire-cutters provided with an improved insulated handle and cutting blades or knives.

The said invention embraces the following organization, to wit: a pair of shears of a construction hereinafter described; wooden rods, into the ends of which are detachably fitted, respectively, the metal handles of the said shears; a rubber tube surrounding each wooden rod from the points of insertion of the metal handles to within about six inches of the opposite end of said rod, the rubber tube being enlarged at one end and surrounding that part of the rod which is not surrounded by the first-named and smaller portion of the said tube. The enlarged part of the rubber tube, together with the remainder of the tube, forms an insulating-covering to the wooden rod, so that even if the outside of the tube becomes wet by rain, snow, or stream of water from the hose, yet no electric current could pass from the shears while cutting a wire to the operator's hands, which are supposed to be holding the bare wooden rods underneath the enlarged portion of the tubes. The enlarged portion of the rubber tube might be omitted; but in this case the operator would need gloves, which are objectionable as inconvenient, uncomfortable, and expensive.

The device as to all its details and modifications is represented in the accompanying figures of drawings, in which—

Figure 6:
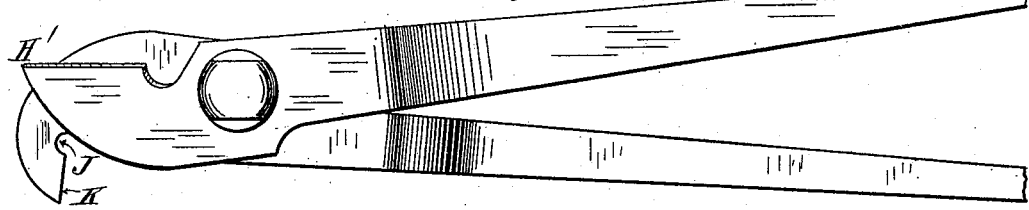
Figure 7:
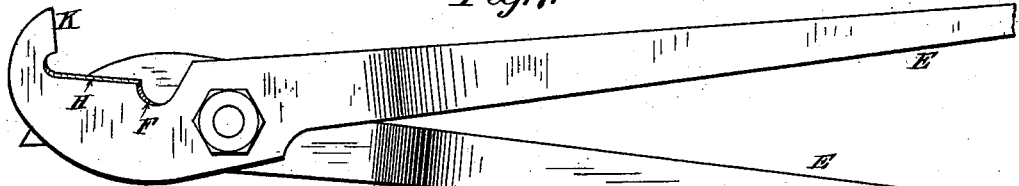
Figure 8:
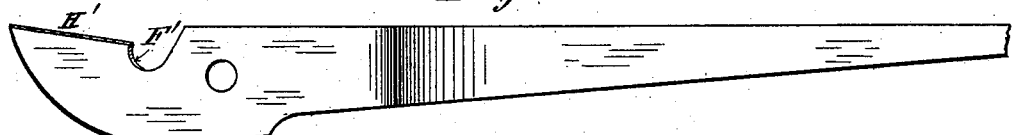
Figure 9:
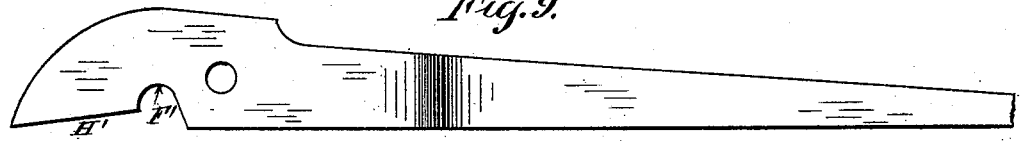
Figure 10:
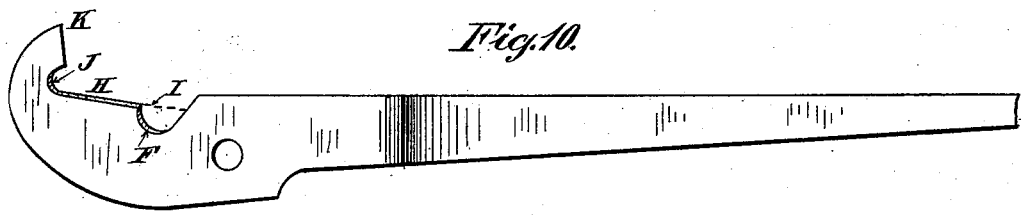
Figure 11:
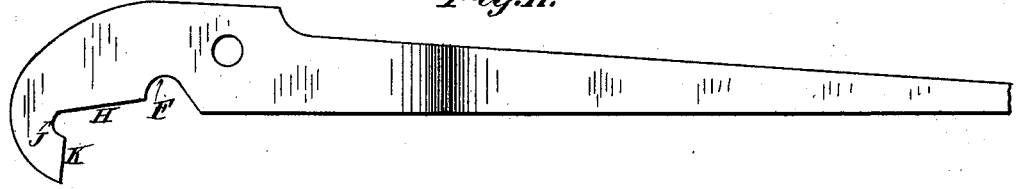

Figure 1 is a view of the instrument in its simplest construction. Fig. 2 is a perspective view of the rubber tube shown separated from the instrument. Fig. 3 is a perspective view of the wooden rod or core of the insulated handles. Fig. 4 shows, respectively, a sectional and exterior view of the preferred construction of the insulated handles, the same being duplicates of each other. Fig. 5 is an end view of one of the insulated handles, showing how the enlarged portion forms a covering to the operator's hands. Fig. 6 shows a view of the shears themselves, being omitted from the view in Fig. 4. Fig. 7 shows the opposite side of the device as seen in Fig 6. Fig. 8 is a front view of one of the blades. Fig. 9 is a back view of the same blade. Fig. 10 is a front view of the other blade, and Fig. 11 is a back view of the last-named blade.

The complete device embodying our invention consists of the following elements:

A represents wooden rods or cores of detachable insulated handles having square holes in one end of each core and cut away sufficiently at the opposite ends to form suitable places for the operator's hands.

B shows a ring placed upon that end of each core containing the hole.

C is a rubber tube fitting tightly in Fig. 1 throughout the entire length of the wooden core, while in Figs. 4 and 5 an enlargement of the tube is so provided upon each rubber tube as to form a loose covering for the cut-away portions of the wooden cores, the enlargement of the said tube being represented by the character D, metal handles represented by E and provided with roughened ends, which fit detachably in the said holes in the ends of the said wooden cores, and blades whose construction is more particularly described below, and which, in combination with the long insulated handles, may be employed to cut wires even as large as No. 00 with unusual convenience and without danger to the operator.

One blade is provided with a curved cutting-edge F at a given distance from the pivot G of the shears, the said curved edge being substantially coincident with an arc of a circle whose center lies in a projection of a rectilinear cutting-edge H at a greater distance from the said pivot than that of the said curved cutting-edge, the said projection of the straight edge being shown by the dotted line I, a second curved edge J provided upon said blade at a greater distance from the said pivot than that of the rectilinear edge H, and a second rectilinear edge K also provided upon the said blade, and substantially at right angles to the first-named rectilinear edge, the last two edges forming an efficient hook, whereby a wire may be pulled from a given height to a less height, they therefore being termed "gripping-edges," while the edge J is also a cutting-edge. The edges F, H, and J are called "cutting-edges," because when they are made to slide past the edges on the other blade they will cut a wire into two parts. The other blade is substantially like the first-described blade, with the exception of the two edges J and K, which are not provided; but the edge H', corresponding to the edge H, is longer than the edge H, so that it will form shears when passing by the cutting-edge J.

The function of the edge K is to pull down wires so as to get them into convenient distance of the operator, so that he may cut them; or, if they are small wires and there is little time to spend in cutting, the wires may be pulled all the way to the ground. The function of the edge J, in combination with the edge H', is to cut small wires. The object of having the edge H in combination with the edge H' is to cut medium-sized wires as well as small ones. The edge F, in combination with the corresponding edge F', located on the other blade, is to cut the largest-sized wires. Such wires are practically not flexible, and the shears can by means of the strong and long insulated handles be pressed up against the large wires until the same are cut into two parts each; or the same cutting-edges F and F' may similarly be used to cut a cable composed of small wires.

The instrument hereinbefore described is particularly intended for use by firemen, who may use them without fear of danger, the insulated handles being long and strong and provided with the enlarged rubber portions D, which cover the fireman's hands and prevent any water to form a circuit for the electric current from the conductors which are being cut to the body of the fireman.

Having described our invention, what we claim is as follows:

1. In firemen's electric-wire cutters, the combination of metal handles for the said cutters, a wooden core provided with a hole in one end and fitted detachably upon each one of the metal handles, and a rubber tube surrounding and fitting tightly upon the said wooden core.

2. In combination with the metallic handles of a pair of wire-cutters, detachable insulated handles.

3. Insulated handles consisting of wooden cores provided with holes in the ends, in combination with rubber tubes having enlarged portions and passed over the said cores, the enlarged portions being at the ends of the said tubes and located upon the said cores at those ends opposite the ends of the cores containing the said holes.

In testimony that we claim the foregoing as our invention we have signed our names, in presence of two witnesses, this 13th day of February, 1889.

DANIEL A. WOODHOUSE.
THOMAS V. FORSTER.

Witnesses:
 NELLIE L. POPE,
 EDWARD P. THOMPSON.